United States Patent [19]

Takei et al.

[11] Patent Number: 5,238,989

[45] Date of Patent: Aug. 24, 1993

[54] POLYPROPYLENE RESIN COMPOSITION

[75] Inventors: Hiroshi Takei; Rikio Yonaiyama, both of Ichihara; Michio Kasai, Kisarazu; Nobukazu Atsumi, Ichihara, all of Japan

[73] Assignee: Chisso Corporation, Osaka, Japan

[21] Appl. No.: 820,668

[22] PCT Filed: May 20, 1991

[86] PCT No.: PCT/JP91/00668

§ 371 Date: Jan. 16, 1992

§ 102(e) Date: Jan. 16, 1992

[87] PCT Pub. No.: WO91/18049

PCT Pub. Date: Nov. 28, 1991

[30] Foreign Application Priority Data

May 21, 1990 [JP] Japan .................................. 2-129199

[51] Int. Cl.$^5$ ............................................. C08K 3/34
[52] U.S. Cl. .................................... 524/449; 524/493; 524/494; 525/64
[58] Field of Search ................... 524/449, 493, 494; 525/64

[56] References Cited

U.S. PATENT DOCUMENTS 4,603,153 7/1986 Sobajima et al. .................... 524/449
4,983,647 1/1991 Ueno et al. .......................... 524/449

Primary Examiner—Paul R. Michl
Assistant Examiner—Edward Cain
Attorney, Agent, or Firm—Leydig, Voit & Mayer

[57] ABSTRACT

The present invention provides a polypropylene resin composition which permits the formation of materials having high strength and stiffness, less warpage deformation and such excellent mechanical durability that these materials can be used when load is applied continuously for a long term or when load is applied repeatedly.

The polypropylene resin composition contains the three components of (a) 40 to 75% by weight of a modified polypropylene obtained by heating and melting a mixture prepared by adding at least (1) 0.01 to 2% by weight of an unsaturated acid, (2) 0.1 to 3% by weight of an unsaturated silane and (3) an organic peroxide to a crystalline polypropylene, (b) 10 to 35% by weight of glass fibers, and (c) 15 to 45% by weight of a mica powder, and the components (b) and (c) are blended with the component (a) so that the total amount of the components (b) and (c) may be in the range of from 25 to 60% by weight based on the composition.

6 Claims, 3 Drawing Sheets

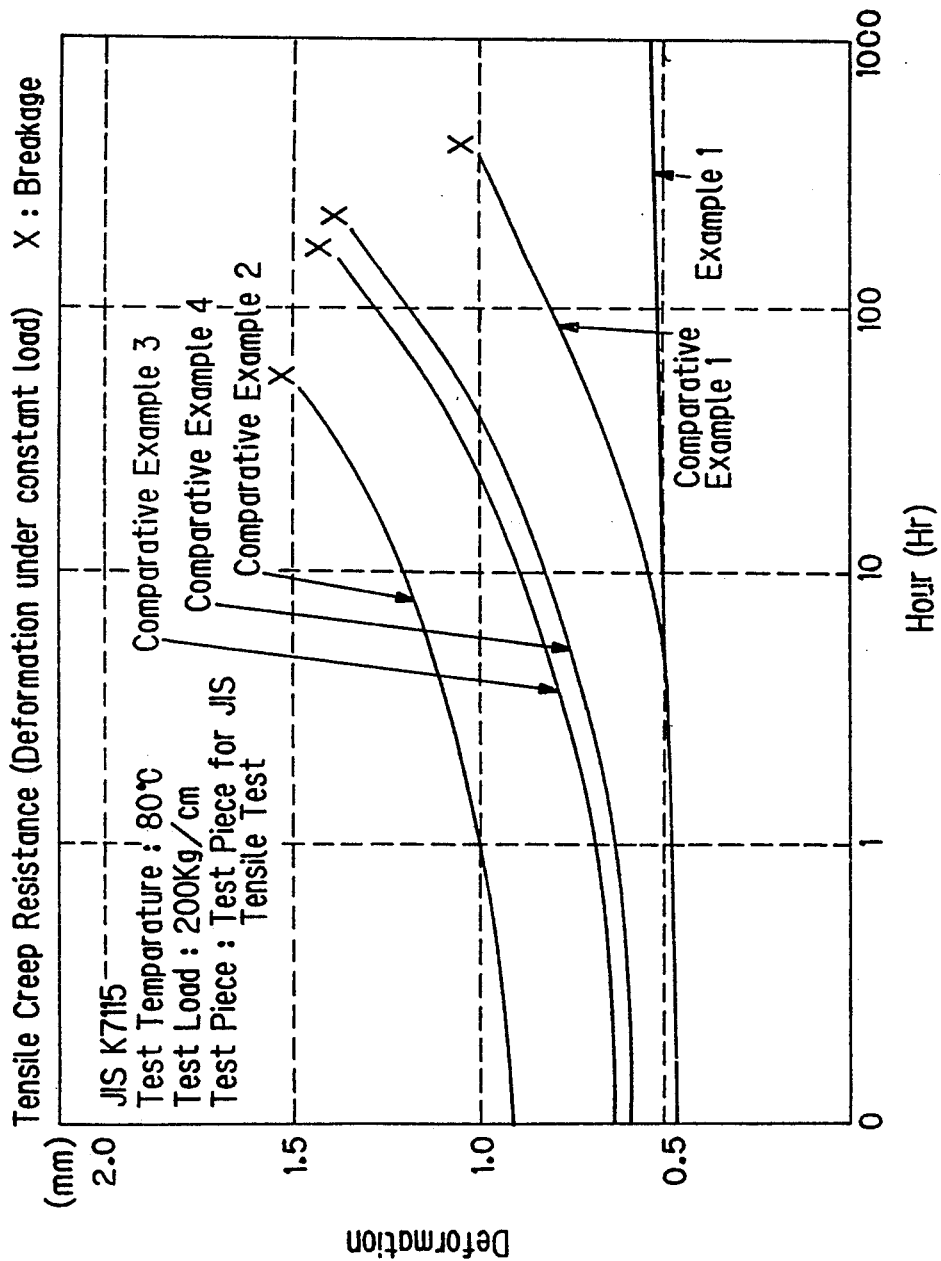

POLYPROPYLENE RESIN COMPOSITION

TECHNICAL FIELD

The present invention relates to a propylene composition which is compositely reinforced with a glass fiber and a mica powder. More specifically, it relates to a polypropylene composite resin composition having high strength and stiffness, less warpage deformation and particularly outstanding improved mechanical durability.

BACKGROUND ART

Polypropylenes which are reinforced with a glass fiber are excellent in chemical resistance, and they are also excellent in strength as compared with other polypropylenes which are reinforced with a lamellar filler or a granular filler. Furthermore, they are inexpensive, and so they are now used as useful industrial materials in many fields.

However, the glass fiber-reinforced polypropylenes are crystalline resins, and therefore they have the drawback that the warpage of molded articles thereof is larger as compared with glass fiber-reinforced articles of non-crystalline resins. Accordingly, as a means for inhibiting the warpage deformation, a technique is disclosed in which a rubber component such as an elastomer is added, but when the rubber component is added, strength and stiffness noticeably deteriorate.

Furthermore, techniques in which the glass fiber and the mica powder of the lamellar filler are used together are disclosed in Japanese Patent Application Laid-open Nos. 58-206659 and 61-98758, and it is described in these publications that materials having high strength and stiffness and excellent dimensional accuracy can be obtained.

On the other hand, techniques in which a small amount of the glass fiber is blended for the purpose of improving the strength of the polypropylene filled with the mica powder are disclosed in Japanese Patent Application Laid-open Nos. 52-36141, 55-45715, 55-40719 and 60-23432.

In techniques in which the polypropylenes are compositely reinforced with the glass fiber and the mica powder, the interface adhesion between the filler and the matrix resin has been investigated to improve strength by a process of grafting an unsaturated silane on the matrix resin, a process of grafting an unsaturated acid or a process of blending an isocyanate compound and an epoxy compound with the matrix resin.

In all of these techniques, however, only initial strength has been inspected, and with regard to mechanical durability in the case that load is applied for a long period of time or applied repeatedly, no inspection has been made at all.

On the other hand, Japanese Patent Application Laid-open No. 60-1235 discloses that in the blend system singly containing the glass fiber, a resin composition is used which can be obtained by melting and kneading an unsaturated acid and an unsaturated silane simultaneously with a polypropylene in the presence of an organic peroxide.

However, this technique also intends to improve the initial strength as in the above-mentioned cases, and the mechanical durability has not been inspected at all.

As discussed above, the polypropylenes which are compositely reinforced with glass fibers and mica powder can provide molded articles having high strength and stiffness, less warpage deformation and excellent dimensional accuracy, and therefore they are industrially useful materials. However, under conditions where load is continuously applied for a long period of time or that load is applied repeatedly, durability is often insufficient, and the utilization of these polypropylenes has been restricted in many cases.

An object of the present invention is to provide a polypropylene resin composition which permits the formation of materials having high strength and stiffness, less warpage deformation and such excellent mechanical durability that these materials can be used when a load is applied continuously for a long term or when a load is applied repeatedly.

DISCLOSURE OF THE INVENTION

A polypropylene resin composition of the present invention contains components (a), (b) and (c) in the following concentration ranges, respectively, the components (b) and (c) being blended with the component (a) so that the total amount of the components (b) and (c) may be in the range of from 25 to 60% by weight based on the composition, the component (a): 40 to 75% by weight of a modified polypropylene obtained by heating and melting a mixture prepared by adding at least (1) 0.01 to 2% by weight of an unsaturated acid, (2) 0.1 to 3% by weight of an unsaturated silane and (3) an organic peroxide to a crystalline polypropylene, the component (b : 10 to 35% by weight of glass fibers, and the component (c): 15 to 45% by weight of a mica powder.

The blend ratios of the unsaturated acid and the unsaturated silane in the modified propylene of the component (a) are preferably from 0.01 to 2% by weight and from 0.1 to 3% by weight based on the polypropylene, respectively, more preferably from 0.05 to 1% by weight and from 0.3 to 2% by weight based on the polypropylene, respectively.

The effect of the present invention can be obtained only by using the polypropylene modified in the presence of the unsaturated acid and the unsaturated silane. Therefore, it is necessary that the unsaturated acid and the unsaturated silane are blended in amounts larger than the lower limits of the above-mentioned ranges. Conversely, even if either or both of the unsaturated acid and the unsaturated silane are blended in amounts above the above-mentioned ranges, the effect of further improvement cannot be obtained. When the amount of the unsaturated acid is in excess of the above-mentioned range, the deterioration of the resin is noticeable, and when the amount of the unsaturated silane is in excess of the above-mentioned range, the fluidity of the resin decreases significantly, with the result that moldability declines and cost increases.

The improvement effect of the mechanical durability by the use of the modified polypropylene obtained by the modification in the presence of the unsaturated acid and the unsaturated silane in the composition of the present invention can be obtained only by simultaneously using the glass fiber and the mica powder. That is, in the case of the blend system containing the glass fiber singly, the improvement effect of the mechanical durability cannot be obtained. When the glass fibers and another lamellar filler are used together, and when the mica powder is replaced with, for example, talc, the improvement in mechanical durability cannot be obtained.

The present inventors have found that the improvement in mechanical durability can be exhibited only in the system in which the glass fibers and the mica powder are blended with the modified polypropylene.

To the modified polypropylene of the composition according to the present invention, an unmodified polypropylene may be added, but in this case, the final concentrations of the unsaturated acid and the unsaturated silane in the total polypropylene component is required to be in the range described in the claim of the present invention (even when the unmodified polypropylene is added to the modified polypropylene, it will be hereinafter referred to simply as "modified polypropylene" at times).

Examples of the unsaturated acid which can be used for the formation of the modified polypropylene include acrylic acid, methacrylic acid, maleic acid, fumaric acid, citraconic acid and anhydrides thereof, and maleic anhydride is most preferable. They can be used singly or in combination.

Examples of the unsaturated silane include 3-methacryloxypropyltrimethoxysilane, vinyltrimethoxysilane, vinyltriethoxysilane, vinyltriacetoxysilane, methylvinyldimethoxysilane, phenylvinyldimethoxysilane and allyltrimethoxysilane, and 3-methacryloxypropyltrimethoxysilane is most preferable. They can be used singly or in combination.

No particular restriction is put on the crystalline polypropylene which is used as a raw material for the modified polypropylene, but typical examples of the crystalline polypropylene include a homopolymer of propylene, and random copolymers and block copolymers of propylene and α-olefins such as ethylene, butene-1, hexene-1 and octene-1.

As a technique of melting and kneading the polypropylene, the unsaturated acid and the unsaturated silane, any of known various methods can be used, but a convenient method can be used which comprises adding the above-mentioned unsaturated acid and unsaturated silane and an organic peroxide such as di-t-butyl peroxide, dicumyl peroxide and benzoyl peroxide to the polypropylene powder, stirring and mixing them, and then melting, kneading and extruding the mixture at a temperature of from 150° to 300° C., preferably from 180° to 250° C. by the use of an extruder.

The amount of the organic peroxide to be used is preferably in the range of from 0.01 to 0.5% by weight.

The glass fiber usable in the composition of the present invention is usually chopped glass strands or a glass roving which is manufactured and commercially sold as a material for the reinforcement of resins. The preferable glass fiber has an average fiber diameter of from 5 to 20 μm and an average fiber length of 0.5 to 10 mm in the case of the chopped glass strands.

No particular restriction is put on the mica powder which is used in the composition of the present invention, but it can be selected from the wide range of biotite, lisia mica, common mica and phlogopite. The mica powder may be subjected to a surface treatment, but even the mica powder which has not undergone the surface treatment can also exert a sufficient effect. In the particularly preferable mica powder, a ratio of the average diameter to the average thickness of the mica crystal plates, i.e., an average aspect ratio is 20 or more, because warpage deformation is controlled when such a mica powder is used.

In the composition of the present invention, it is necessary that amounts of the glass fibers and the mica powder are in the range of from 10 to 35% by weight and in the range of from 15 to 45% by weight, respectively. When the amount of the glass fibers is less than 10% by weight, a composition having lower initial strength is obtained, before the problem of the mechanical durability, and consequently, the application of such a composition as a functional component is largely restricted. Conversely, when the amount of the mica powder to be used is less than 15% by weight, the dimensional stability which is the purpose of the present invention is impaired, so that the warpage deformation increases. Furthermore, the glass fiber and the mica powder are required to be blended so that the total amount of both the components may be from 25 to 60% by weight of the total composition. When the total amount of these components is in excess of 60% by weight, it is difficult to achieve industrially stable production.

The composition of the present invention can be prepared by any of the following methods. For example, (1) a method which comprises mixing the above-mentioned modified polypropylene, mica powder and glass fiber in the predetermined amounts, and then melting, kneading and extruding the mixture at a melting/kneading temperature of from 150° to 300° C., preferably from 180° to 250° C. by the use of a uniaxial or a biaxial extruder, (2) a method which comprises feeding the modified polypropylene and the mica powder through a usual material feed orifice to a position of an extruder where the modified polypropylene is sufficiently melted, the aforesaid extruder being equipped with a midway addition orifice for feeding another raw material, and then melting, kneading and extruding the mixture at the above-mentioned temperature, while the glass fibers are fed through the midway addition orifice, and (3) a method which comprises feeding the modified polypropylene only through the usual material feed orifice, and then melting, kneading and extruding the mixture at the above-mentioned temperature, while the mica powder and the glass fibers are fed through the midway addition orifice.

Various additives can be added to the composition of the present invention, and examples of the additives include an antioxidant, an ultraviolet absorber, an antistatic agent and a pigment.

In the composition of the present invention, any improvement of initial strength is not expected but mechanical durability can be remarkably improved. Therefore, the composition of the present invention is useful in cases where load is applied for a long period of time or repeatedly for a long term. In other words, the present invention can provide the composition which is useful as functional parts such as automobiles, domestic appliances and general industrial parts in a wide range.

BRIEF DESCRIPTION OF THE DRAWINGS

FIG. 3 shows a relation between time and deformation as a result of a tensile creep test for a long time under a constant load (200 kg/cm$^2$).

BEST MODE FOR CARRYING OUT THE INVENTION

The present invention will be described in detail in accordance with examples and comparative examples. It should be noted that the present invention is not limited by these examples.

The performance of compositions in the examples and the comparative examples was evaluated by the following tests.

Initial physical properties

Measurement of tensile strength (JIS K7113)
Measurement of flexural modulus (JIS K7203)
Measurement of izod Impact strength (JIS K7110)

Mechanical durability

Measurement of tensile creep properties (JIS K7115)
Measurement of vibration properties (ASTM D671B)

Warpage deformation

A maximum warpage deformation was measured.

A test piece for each test was a 150-mm-wide, 2-mm-thick, 150-mm-long plate which was prepared by injection molding, utilizing the whole surface of one side thereof as a film gate. Each test piece was then subjected to conditioning for 48 hours at a temperature of 23° C. at a relative humidity of 50%. Afterward, each test piece was fixed at the opposite corners of the one side thereof on a horizontal base, and a distance of the separated opposite side of the test piece from the horizontal surface of the base was measured. The thus measured value was regarded as the warpage deformation. However, when the side of the test piece to be fixed is altered, the warpage deformation also changes. Therefore, the warpage was measured by changing the side of each test piece to be fixed, and the largest value of the measured values was regarded as the maximum warpage deformation. Its unit was "mm".

The melt flow rate of each propylene polymer used in the examples and the comparative examples is a value (g/10 minutes) measured in accordance with JIS K7210-1776.

EXAMPLE 1

0.5% by weight of maleic anhydride, 1.0% by weight of 3-methacryloxypropyltrimethoxysilane, 0.1% by weight of 2,6-di-t-butylparazole, 0.1% by weight of calcium stearate and 0.1% by weight of 1,3-bis(t-butylperoxyisopropyl)benzene were added to 98.20% by weight of a propylene homopolymer having a melt flow rate of 2.0, and they were then stirred and mixed. Afterward, the mixture was fed through a usual raw material feed orifice to a biaxial extruder having a plurality of material feed orifices each having a diameter of 45 mm and L/D of 30, and it was then melted, kneaded and extruded at a melting/kneading temperature of 200° C. to obtain pellets of a modified polypropylene.

50% by weight of the modified polypropylene pellets and 20% by weight of a mica powder having an aspect ratio of 35 were stirred and mixed, and the mixture was fed to the above-mentioned biaxial extruder through the usual material feed orifice. 30% by weight of glass fibers having a strand diameter of 9 μm and a strand length of 3 mm were metered and fed through another feed orifice provided in a cylinder portion, and the mixture was then melted, kneaded and extruded at a temperature of 250° C. to prepare pellets.

Figure 1:
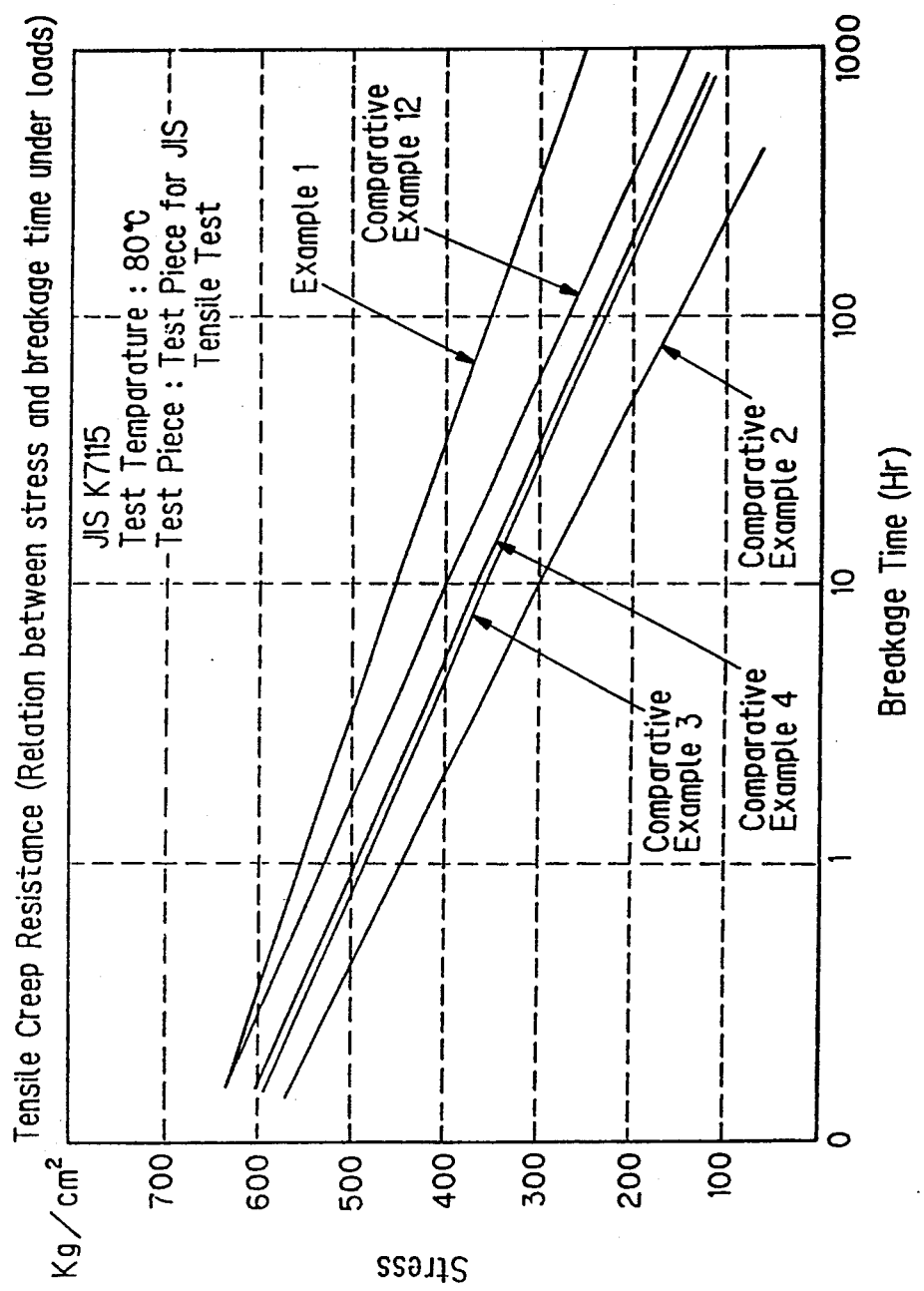
FIG. 1 shows a relation between loaded stress and breakage time in accordance with a creep test in which load is changed.
Figure 2:
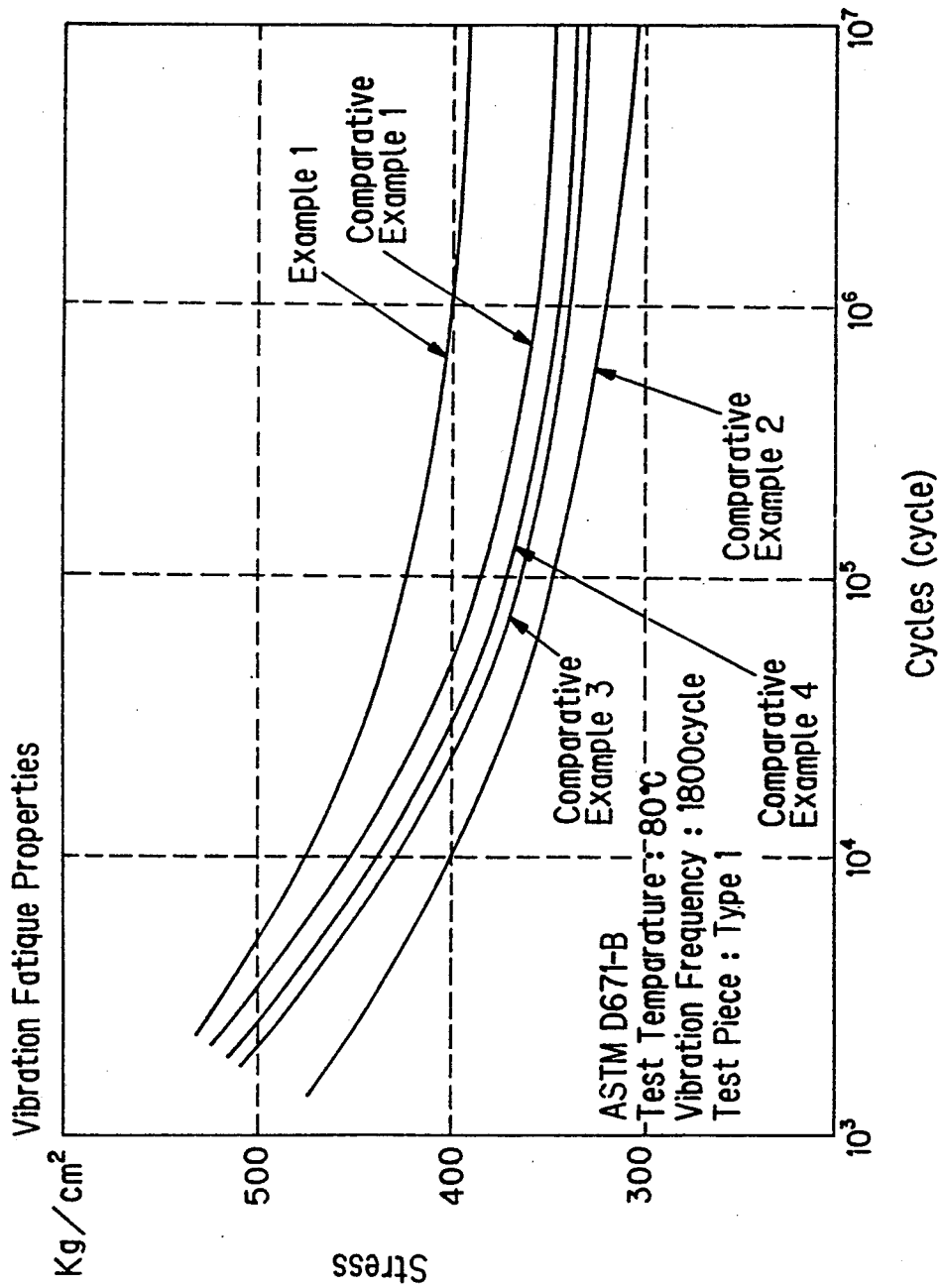
FIG. 2 shows a breakage cycle number under stress in accordance with a vibration fatigue test under various loads.

The results of evaluation are shown in Table 1 and FIGS. 1 to 3.

COMPARATIVE EXAMPLE 1

0.5% by weight of maleic anhydride, 0.1% by weight of 2,6-di-t-butylparazole, 0.1% by weight of calcium stearate and 0.1% by weight of 1,3-bis(t-butylperoxyisopropyl)benzene were added to 98.20% by weight of a propylene homopolymer having a melt flow rate of 2.0, and they were then stirred and mixed. The mixture was melted, kneaded and extruded by the same procedure as in Example 1 to obtain pellets of a modified polypropylene.

Afterward, the thus obtained modified polypropylene pellets, a mica powder and glass fibers were melted, kneaded and extruded in the same manner as in Example 1 to prepare pellets.

The results of evaluation are shown in FIGS. 1 to 3.

COMPARATIVE EXAMPLE 2

1.0% by weight of 3-methacyloxypropyltrimethoxysilane, 0.1% by weight of 2,6-di-t-butylparazole, 0.1% by weight of calcium stearate and 0.1% by weight of 1,3-bis(t-butylperoxyisopropyl)benzene were added to 98.70% by weight of a propylene homopolymer having a melt flow rate of 2.0, and they were then stirred and mixed. The mixture was melted, kneaded and extruded by the same procedure as in Example 1 to obtain pellets of a modified polypropylene.

Afterward, the thus obtained modified polypropylene pellets, a mica powder and glass fibers were melted, kneaded and extruded in the same manner as in Example 1 to prepare pellets.

The results of evaluation are shown in Table 1 and FIGS. 1 to 3.

COMPARATIVE EXAMPLE 3

50% by weight of the modified polypropylene pellets obtained in Example 1 and 20% by weight of a talc powder (Muramatsu Sangyou Co., Ltd.; trade name High Filler 5000 PJ) were stirred, and mixed, and 30% by weight of glass fibers were added thereto. The mixture was then melted, kneaded and extruded in the same manner as in Example 1, thereby preparing pellets.

The results of evaluation are shown in Table 1 and FIGS. 1 to 3.

COMPARATIVE EXAMPLE 4

50% by weight of the modified polypropylene pellets obtained in Comparative Example 1 and 20% by weight of the same talc powder as used in Comparative Example 3 were stirred and mixed, and 30% by weight of glass fibers were further added thereto. The mixture was then melted, kneaded and extruded in the same manner as in Example 1, thereby obtaining pellets.

The results of evaluation are shown in Table 1 and FIGS. 1 to 3.

COMPARATIVE EXAMPLE 5

70% by weight of the modified polypropylene pellets obtained in Example 1 was fed to an extruder through a usual material feed orifice, and 30% by weight of glass fibers were further added thereto. The mixture was then melted, kneaded and extruded in the same manner as in Example 1, thereby obtaining pellets.

The results of evaluation are shown in Table 1.

COMPARATIVE EXAMPLE 6

70% by weight of the modified polypropylene pellets obtained in Comparative Example 1 was fed to an extruder through a usual material feed orifice, and 30% by weight of glass fibers were further added thereto. The mixture was then melted, kneaded and extruded in the same manner as in Example 1, thereby obtaining pellets.

The results of evaluation are shown in Table 1.

COMPARATIVE EXAMPLE 7

0.005% by weight of maleic anhydride, 1.0% by weight of 3-methacyloxypropyltrimethoxysilane, 0.1% by weight of 2,6-di-t-butylparazole, 0.1% by weight of calcium stearate and 0.1% by weight of 1,3-bis(t-butylperoxyisopropyl)benzene were added to 98.695% by weight of a propylene homopolymer having a melt flow rate of 2.0, and they were then stirred and mixed. The mixture was melted, kneaded and extruded by the same procedure as in Example 1 to obtain pellets of a modified polypropylene.

Afterward, the thus obtained modified polypropylene pellets, mica powder and glass fibers were melted, kneaded and extruded in the same manner as in Example 1 to obtain pellets.

The results of evaluation are shown in Table 2.

EXAMPLE 2

0.02% by weight of maleic anhydride, 1.0% by weight of 3-methacyloxypropyltrimethoxysilane, 0.1% by weight of 2,6-di-t-butylparazole, 0.1% by weight of calcium stearate and 0.1% by weight of 1,3-bis(t-butylperoxyisopropyl)benzene were added to 98.68% by weight of a propylene homopolymer having a melt flow rate of 2.0, and they were then stirred and mixed. The mixture was melted, kneaded and extruded by the same procedure as in Example 1 to obtain pellets of a modified polypropylene.

Afterward, the thus obtained modified polypropylene pellets, a mica powder and a glass fiber were melted, kneaded and extruded in the same manner as in Example 1 to obtain pellets.

The results of evaluation are shown in Table 2.

EXAMPLE 3

2.0% by weight of maleic anhydride, 1.0% by weight of 3-methacyloxypropyltrimethoxysilane, 0.1% by weight of 2,6-di-t-butylparazole, 0.1% by weight of calcium stearate and 0.1% by weight of 1,3-bis(t-butylperoxyisopropyl)benzene were added to 96.70% by weight of a propylene homopolymer having a melt flow rate of 2.0, and they were then stirred and mixed. The mixture was melted, kneaded and extruded by the same procedure as in Example 1 to obtain pellets of a modified polypropylene.

Afterward, the thus obtained modified polypropylene pellets, mica powder and glass fibers were melted, kneaded and extruded in the same manner as in Example 1 to obtain pellets.

The results of evaluation are shown in Table 2.

COMPARATIVE EXAMPLE 8

0.5% by weight of maleic anhydride, 0.05% by weight of 3-methacyloxypropyltrimethoxysilane, 0.1% by weight of 2,6-di-t-butylparazole, 0.1% by weight of calcium stearate and 0.1% by weight of 1,3-bis(t-butylperoxyisopropyl)benzene were added to 99.15% by weight of a propylene homopolymer having a melt flow rate of 2.0, and they were then stirred and mixed. The mixture was melted, kneaded and extruded by the same procedure as in Example 1 to obtain pellets of a modified polypropylene.

The results of evaluation are shown in Table 2.

EXAMPLE 4

0.5% by weight of maleic anhydride, 0.1% by weight of 3-methacyloxypropyltrimethoxysilane, 0.1% by weight of 2,6-di-t-butylparazole, 0.1% by weight of calcium stearate and 0.1% by weight of 1,3-bis(t-butylperoxyisopropyl)benzene were added to 99.10% by weight of a propylene homopolymer having a melt flow rate of 2.0, and they were then stirred and mixed. Next, the mixture was melted, kneaded and extruded by the same procedure as in Example 1 to obtain pellets of a modified polypropylene.

Afterward, the thus obtained modified polypropylene pellets, mica powder and glass fibers were melted, kneaded and extruded in the same manner as in Example 1 to obtain pellets.

The results of evaluation are shown in Table 2.

EXAMPLE 5

0.5% by weight of maleic anhydride, 3.0% by weight of 3-methacyloxypropyltrimethoxysilane, 0.1% by weight of 2,6-di-t-butylparazole, 0.1% by weight of calcium stearate and 0.1% by weight of 1,3-bis(t-butylperoxyisopropyl)benzene were added to 96.20% by weight of a propylene homopolymer having a melt flow rate of 2.0, and they were then stirred and mixed. The mixture was melted, kneaded and extruded by the same procedure as in Example 1 to obtain pellets of a modified polypropylene.

Afterward, the thus obtained modified polypropylene pellets, mica powder and glass fibers were melted, kneaded and extruded in the same manner as in Example 1 to obtain pellets.

The results of evaluation are shown in Table 2.

COMPARATIVE EXAMPLE 9

In this comparative example, a mixture of the modified polypropylene (hereinafter referred to simply as "maleic anhydride-modified PP" at times) obtained by grafting maleic anhydride at a high concentration and an unmodified polypropylene was used, and furthermore as a filler, there was used mica powder (hereinafter referred to simply as "unsaturated silane-treated mica powder at times) treated with 3-methacyloxypropyltrimethoxysilane.

That is, 5% by weight of maleic anhydride-modified PP prepared by the undermentioned process, 45% by weight of the polypropylene homopolymer used in Example 1 and 20% by weight of a mica powder previously treated by the undermentioned process were stirred, and the mixture was then fed to an extruder through a usual material feed orifice. Afterward, 30% by weight of glass fibers was further added thereto, and the mixture was then melted, kneaded and extruded in the same manner as in Example 1, thereby obtaining pellets.

Preparation of maleic anhydride-modified PP

5% by weight of maleic anhydride and 0.1% by weight of 1,3-bis(t-butylperoxyisopropyl)benzene were reacted with 94.9% by weight of a propylene homopolymer having a melt flow rate of 2.0 in xylene at 140° C. for 2 hours.

After completion of the reaction, the reaction product was precipitated in acetone, filtered with suction, and then dried to obtain the maleic anhydride-modified PP.

Preparation of unsaturated silane-treated mica powder 97.5% by weight of a mica powder and 2.5% by weight of 3-methacyloxypropyltrimethoxysilane were stirred and mixed to obtain the unsaturated silane-treated mica powder.

The results of evaluation are shown in Table 2.

COMPARATIVE EXAMPLE 10

85% weight of the modified polypropylene pellets obtained in Example 1 and 5% by weight of mica powder were stirred and mixed, and 10% by weight of glass fibers were further added thereto, and the mixture was then melted, kneaded and extruded in the same manner as in Example 1, thereby obtaining pellets.

The results of evaluation are shown in Table 3.

EXAMPLES 6 to 8, Comparative Examples 11 and 12

In each example, the modified polypropylene pellets obtained in Example 1, mica powder and glass fibers were blended in a ratio shown in Table 3, and the mixture was then melted, kneaded and extruded in the same manner as in Example 1, thereby obtaining pellets.

The results of evaluation are shown in Table 3.

The evaluation results of the above-mentioned examples and comparative examples are shown in Tables 1 to 3 and FIGS. 1 to 3.

TABLE 1

| | Composition (blend ratio) | | | | | |
|---|---|---|---|---|---|---|
| | (a) Modified Polypropylene | | | Each Filler (wt %) | | |
| | Unsaturated Acid and Unsaturated Silane to (a) (wt %) | | Modified Polypropylene (wt %) | (b) Glass Fiber | (c) Mica Powder | (d) Talc Powder |
| | Unsaturated Acid | Unsaturated Silane | | | | |
| Example 1 | 0.5 | 1.0 | 50 | 30 | 20 | 0 |
| Comp. Ex. 1 | 0.5 | 0 | 50 | 30 | 20 | 0 |
| Comp. Ex. 2 | 0 | 1.0 | 50 | 30 | 20 | 0 |
| Comp. Ex. 3 | 0.5 | 1.0 | 50 | 30 | 0 | 20 |
| Comp. Ex. 4 | 0.5 | 0 | 50 | 30 | 0 | 20 |
| Comp. Ex. 5 | 0.5 | 1.0 | 70 | 30 | 0 | 0 |
| Comp. Ex. 6 | 0.5 | 0 | 70 | 30 | 0 | 0 |

| | Performance | | | | | |
|---|---|---|---|---|---|---|
| | Initial Physical Properties | | | Mechanical Durability | | Warpage |
| | Tensile Strength (kg/cm$^2$) | Flexural Modulus (kg/cm$^2$) | Notched Izod Impact Strength (kg-cm/cm$^2$) | Resistance* to Tensile Creep (load: 300 kg/cm$^2$) | Vibration Fatigue Properties** (load: 400 kg/cm$^2$) | Deformation (mm) |
| Example 1 | 1450 | 103000 | 14 | 340 | $1.0 \times 10^6$ | 0.5 |
| Comp. Ex. 1 | 1460 | 102500 | 15 | 70 | $5.5 \times 10^4$ | 0.5 |
| Comp. Ex. 2 | 1200 | 103000 | 8 | 10 | $1.0 \times 10^4$ | 0.6 |
| Comp. Ex. 3 | 1250 | 90600 | 10 | 28 | $2.3 \times 10^4$ | 10.0 |
| Comp. Ex. 4 | 1280 | 90000 | 10 | 33 | $3.0 \times 10^4$ | 7.0 |
| Comp. Ex. 5 | 1280 | 53000 | 15 | 65 | $3.3 \times 10^4$ | 12.0 |
| Comp. Ex. 6 | 1260 | 53000 | 15 | 67 | $3.2 \times 10^4$ | 11.5 |

*A time (hour) until each sample broke under a constant load.
**A cycle number (cycle) until each sample broke under a constant load.

TABLE 2

| | Composition (blend ratio) | | | | |
|---|---|---|---|---|---|
| | (a) Modified Polypropylene | | | Each Filler (wt %) | |
| | Unsaturated Acid and Unsaturated Silane to (a) (wt %) | | Modified Polypropylene (wt %) | (b) Glass Fiber | (c) Mica Powder |
| | Unsaturated Acid | Unsaturated Silane | | | |
| Comp. Ex. 7 | 0.005 | 1.0 | 50 | 30 | 20 |
| Example 2 | 0.02 | 1.0 | 50 | 30 | 20 |
| Example 3 | 2.0 | 1.0 | 50 | 30 | 20 |
| Comp. Ex. 8 | 0.5 | 0.05 | 50 | 30 | 20 |
| Example 4 | 0.5 | 0.1 | 50 | 30 | 20 |
| Example 5 | 0.5 | 3.0 | 50 | 30 | 20 |
| Comp. Ex. 9 | Maleic Anhydride-modified PP 1.0 | | Unmodified PP 49 | 30 | unsaturated silane-treated mica 20 |

| | Performance | | | | | |
|---|---|---|---|---|---|---|
| | Initial Physical Properties | | | Mechanical Durability | | Warpage |
| | Tensile Strength (kg/cm$^2$) | Flexural Modulus (kg/cm$^2$) | Notched Izod Impact Strength (kg-cm/cm$^2$) | Resistance* to Tensile Creep (load: 300 kg/cm$^2$) | Vibration Fatigue Properties** (load: 400 kg/cm$^2$) | Deformation (mm) |
| Comp. Ex. 7 | 1250 | 102000 | 9 | 19 | $2.0 \times 10^4$ | 0.5 |
| Example 2 | 1360 | 101000 | 13 | 180 | $7.0 \times 10^5$ | 0.5 |
| Example 3 | 1470 | 103000 | 15 | 330 | $1.1 \times 10^6$ | 0.5 |
| Comp. Ex. 8 | 1420 | 101500 | 14 | 90 | $2.5 \times 10^4$ | 0.6 |

TABLE 2-continued

| | | | | | | |
|---|---|---|---|---|---|---|
| Example 4 | 1430 | 102300 | 13 | 280 | $8.0 \times 10^5$ | 0.6 |
| Example 5 | 1410 | 103000 | 14 | 340 | $1.0 \times 10^6$ | 0.6 |
| Comp. Ex. 9 | 1380 | 103000 | 13 | 80 | $3.5 \times 10^4$ | 0.5 |

*A time (hour) until each sample broke under a constant load.
**A cycle number (cycle) until each sample broke under a constant load.

TABLE 3

| | Composition (blend ratio) | | | | |
|---|---|---|---|---|---|
| | (a) Modified Polypropylene | | | Each Filler | |
| | Unsaturated Acid and Unsaturated Silane to (a) (wt %) | | Modified Polypropylene | (wt %) | |
| | Unsaturated Acid | Unsaturated Silane | (wt %) | (b) Glass Fiber | (c) Mica Powder |
| Comp. Ex. 10 | 0.5 | 1.0 | 85 | 10 | 5 |
| Example 6 | 0.5 | 1.0 | 75 | 10 | 15 |
| Example 7 | 0.5 | 1.0 | 45 | 10 | 45 |
| Comp. Ex. 11 | 0.5 | 1.0 | 50 | 5 | 45 |
| Example 8 | 0.5 | 1.0 | 40 | 35 | 25 |
| Comp. Ex. 12 | 0.5 | 1.0 | 30 | 35 | 35 |

| | Performance | | | | |
|---|---|---|---|---|---|
| | Initial Physical Properties | | | Mechanical Durability | | Warpage |
| | Tensile Strength (kg/cm$^2$) | Flexural Modulus (kg/cm$^2$) | Notched Izod Impact Strength (kg-cm/cm$^2$) | Resistance* to Tensile Creep (load: 300 kg/cm$^2$) | Vibration Fatigue Properties** (load: 400 kg/cm$^2$) | Deformation (mm) |
| Comp. Ex. 10 | 650 | 50000 | 7 | 70 | $4.9 \times 10^4$ | 9.5 |
| Example 6 | 850 | 60000 | 9 | 150 | $1.8 \times 10^5$ | 0.9 |
| Example 7 | 1000 | 105000 | 8 | 210 | $7.8 \times 10^5$ | 0.1 |
| Comp. Ex. 11 | 400 | 50000 | 2 | 40 | $4.92.5 \times 10^4$ | 0.1 |
| Example 8 | 1480 | 112000 | 16 | 380 | $1.8 \times 10^6$ | 0.5 |
| Comp. Ex. 12 | Stable production was impossible | | | | | |

*A time (hour) until each sample broke under a constant load.
**A cycle number (cycle) until each sample broke under a constant load.

Comparing the initial physical properties of Example 1 with those of Comparative Example 1 in Table 1, the tensile strength, the flexural modulus, and the Izod impact strength are at a substantially identical level. However, with regard to the creep breakage time under a constant load (300 kg/cm$^2$) of the mechanical durability, the sample of Example 1 was broken in 340 hours, but the sample of Comparative Example 1,occurred in 70 hours. Thus, it is apparent that the durability improvement effect of Example 1 is about 4.9 times as much as that of Comparative Example 1.

Furthermore, with regard to the vibration fatigue properties under a constant load (400 kg/cm$^2$), the sample of Example 1 was broken in $1.0 \times 10^6$ cycles, but the sample of Comparative Example 1 occurred in $5.5 \times 10^4$ cycles. Thus, it is apparent that the durability improvement of Example 1 is about 19 times as much as that of Comparative Example 1. These results definitely indicate the synergistic effect of the unsaturated acid and the unsaturated silane in the modified polypropylene.

In Comparative Example 2, the warpage deformation was at the same level as in Example 1, but the initial strength was poor and the mechanical durability was worse than in Comparative Example 1.

In Comparative Examples 3 and 4, talc was used as a filler which was a lamellar filler similar to the mica powder, but the synergistic effect of the unsaturated acid and the unsaturated silane in the modified polypropylene was not observed at all.

In Comparative Examples 5 and 6, the glass fiber was used singly, and these examples did not exert any synergistic effect of the unsaturated acid and the unsaturated silane in the modified polypropylene, as in Comparative Examples 3 and 4. Additionally, in these examples, the warpage deformation also was extremely large.

The synergistic effect of the unsaturated acid and the unsaturated silane in the modified polypropylene can also be seen from FIGS. 1, 2 and 3. FIG. 1 shows a relation between loaded stress and breakage time in accordance with a creep test in which load was changed. This figure indicates that the results in Example 1 are much better than in the other comparative examples. Likewise, FIG. 2 shows the results of a vibration fatigue test under various loads regarding Example 1 and Comparative Examples 1 to 4. It is apparent from this figure that the results in Example 1 are much better than in the other comparative examples. FIG. 3 shows results of a tensile creep test for a long time under a constant load (200 kg/cm$^2$) regarding Example 1 and Comparative Examples 1 to 4. According to this figure, the sample of Example 1 exhibited a slight deformation quantity even at the point of time when 1000 hours had been passed, but the samples of the comparative examples were all broken in a short period of time. These results indicate that the effect of the present invention is excellent.

Next, in Table 2, the results of the example and the comparative examples are compared in which the amounts of the unsaturated acid and the unsaturated silane in the modified polypropylene were changed.

In Comparative Example 7 as well as Examples 2 and 3, amounts of the unsaturated silane were constant and those of the unsaturated acid were changed.

It is apparent from the results of these examples that the increase of the amounts of the unsaturated acids improves the tensile strength and the Izod impact strength of the initial physical properties, which also leads to the improvement of the mechanical durability.

In Comparative Example 7 in which the amount of the unsaturated acid was below the lower limit, the initial strength was worse as compared with that of Examples 2 and 3, and with regard to the creep breakage time under a constant load (300 kg/cm$^2$) of the mechanical durability, the sample of Comparative Example 7 was broken in 19 hours, and with regard to the vibration fatigue properties under a constant load (400 kg/cm$^2$), the sample of Comparative Example 7 was broken in $2.0 \times 10^4$ cycles which were at a much lower level as compared with the other examples. On the contrary, in Example 2 where the amount of the unsaturated acid was in the vicinity of the lower limit and in Example 3 where the amount of the unsaturated acid was the upper limit, the initial strength was more improved than in Comparative Example 5, and the creep breakage time under a constant load (300 kg/cm$^2$) of the mechanical durability was improved even up to 180 hours in Example 2 and 330 hours in Example 3. Additionally, the vibration fatigue properties under a constant load (400 kg/cm$^2$) were improved even up to $7.0 \times 10^5$ cycles in Example 2 and $1.1 \times 10^6$ cycles in Example 3.

Even if the unsaturated acid is added in an amount above the upper limit, the improvement effect of the strength cannot be expected any more, and, unfortunately, conversely the deterioration of a resin is noticeable and problems such as the diminution of mechanical durability and the yellow discoloration of a resin occur.

In Comparative Example 8 as well as Examples 4 and 5, the amount of the unsaturated acid was constant and the amount of the unsaturated silane was changed (the results of evaluation are set forth in Table 2).

From the results of these examples, it is apparent that the initial physical properties are at substantially similar levels in the respective examples but the mechanical durability is definitely improved by increasing the amount of the unsaturated silane.

In Comparative Example 8 in which the amount of the unsaturated silane was below the lower limit, the initial strength was substantially at the same level as in Examples 4 and 5, but with regard to the creep breakage time under a constant load (300 kg/cm$^2$) of the mechanical durability, the sample of Comparative Example 8 was broken in 90 hours. Additionally, with regard to the vibration fatigue properties under a constant load (400 kg/cm$^2$), the sample was broken in $2.5 \times 10^4$ cycles, which were at a much lower level as compared with the other examples. In contrast, in Example 4 where the amount of the unsaturated silane was the lower limit and in Example 5 where the amount of the unsaturated silane was the upper limit, the mechanical durability was improved remarkably.

That is, the creep breakage time under a constant load (300 kg/cm$^2$) was improved even up to 280 hours in Example 4 and 340 hours in Example 5. Additionally, the vibration fatigue properties under a constant load (400 kg/cm$^2$) were improved even up to $8.0 \times 10^5$ cycles in Example 4 and $1.0 \times 10^6$ cycles in Example 5.

When the unsaturated silane is added in an amount above the upper limit, the improvement effect of the mechanical durability cannot be expected, and moreover, cost increases and the fluidity of a resin decreases extremely to worsen moldability.

In Comparative Example 9, a mixture of the modified polypropylene obtained by grafting maleic anhydride at a high concentration and an unmodified polypropylene was used, and furthermore as a filler, there was used a mica powder treated with the unsaturated silane.

In this example, the final composition was the same as in Example 1, but the mica powder treated with the unsaturated silane was used. Since the unsaturated silane was not used in the step of the graft reaction with the polypropylene, the improvement effect of the mechanical durability was not perceived at all.

In Table 3, there are compared the results obtained by changing the amounts of the modified polypropylene, the glass fiber and the mica powder used in Example 1.

In Comparative Example 10 as well as Examples 6 and 7, the amount of the glass fibers was constant, and amount of the mica powder was changed.

It is elucidated from these examples that the increase of the amount of the mica powder can control the warpage deformation and can outstandingly improve the mechanical durability.

In the first place, in Comparative Example 10 where the amount of the mica powder was below the lower limit, the warpage deformation was 9.5 mm which was much larger as compared with values of the other examples, and with regard to the creep breakage time under a constant load (300 kg/cm$^2$) of the mechanical durability, the sample of Comparative Example 10 was broken in 70 hours. Additionally, with regard to the vibration fatigue properties under a constant load (400 kg/cm$^2$), the sample was broken in $4.9 \times 10^4$ cycles, which were much lower as compared with values of the other examples. In contrast, in Example 6 where the amount of the mica powder was at the lower limit and in Example 7 where the amount of the unsaturated silane was at the upper limit, the warpage deformation was improved even up to 0.9 mm in Example 6 and 0.1 mm in Example 7. Similarly with regard to the mechanical durability, the creep breakage time under a constant load (300 kg/cm$^2$) was improved to 150 hours in Example 6 and 210 hours in Example 7. Furthermore, the vibration fatigue properties under a constant load (400 kg/cm$^2$) were improved to $1.8 \times 10^5$ cycles in Example 6 and $7.8 \times 10^5$ cycles in Example 7.

Next, in Example 7 and Comparative Example 11, the amount of the mica powder was at the upper limit in both cases, and the amount of glass fibers was at and below the lower limit.

In Comparative Example 11 where the amount of the glass fibers was below the lower limit, with regard to the initial physical properties, the tensile strength was 400 kg/cm$^2$, the flexural modulus was 50000 kg/cm$^2$, and the Izod impact strength was 2 kg-cm/cm$^2$, which were much lower as compared with those of the other examples. Therefore, before the discussion of the mechanical durability, it is apparent that the product of Comparative Example 11 is valueless as a raw material for functional parts.

In order to inspect the influence of the total amount of the glass fibers and mica powder, Example 8 and Comparative Example 12 were carried out. In Example 8, the total amount of the glass fibers and the mica powder was the upper limit of the present invention, and in Comparative Example 12, the total amount of the glass fibers and the mica powder was in excess of the upper limit of the present invention.

In Comparative Example 12 where the amount of the glass fibers was at the upper limit and the total amount of the glass fibers and the mica powder was in excess of the upper limit, strands were not stably molded at the time of melting, kneading and extruding, and hence industrially stable production was impossible.

We claim:

1. A polypropylene resin composition containing three components (a), (b) and (c) in the following concentration ranges, respectively, the components (b) and (c) being blended with the component (a) so that the total amount of the components (b) and (c) may be in the range of from 25 to 60% by weight based on the composition:

component (a): 40 to 75% by weight of a modified polypropylene obtained by heating and melting a mixture prepared by adding (1) 0.01 to 2% by weight of an unsaturated acid, (2) 0.1 to 3% by weight of an unsaturated silane and (3) an organic peroxide to a crystalline polypropylene, component (b): 10 to 35% by weight of glass fibers, and component (c): 15 to 45% by weight of a mica powder.

2. The polypropylene resin composition according to claim 1 wherein the unsaturated acid is maleic anhydride.

3. The polypropylene resin composition according to claim 1 wherein the unsaturated silane is 3-methacryloxy-propyltrimethoxysilane.

4. The polypropylene resin composition according to claim 1 wherein the unsaturated acid is maleic anhydride and the unsaturated silane is 3-methacryloxy-propyltri-methoxysilane.

5. The polypropylene resin composition according to claim 1 wherein said composition further contains unmodified polypropylene.

6. The polypropylene resin composition according to claim 1 wherein the concentration of said organic peroxide is 0.01 to 0.5% by weight.

* * * * *